April 8, 1952 W. E. CATTERALL 2,591,671
DEHYDRATION OF ALCOHOLS BY EXTRACTIVE DISTILLATION
Filed Sept. 17, 1948
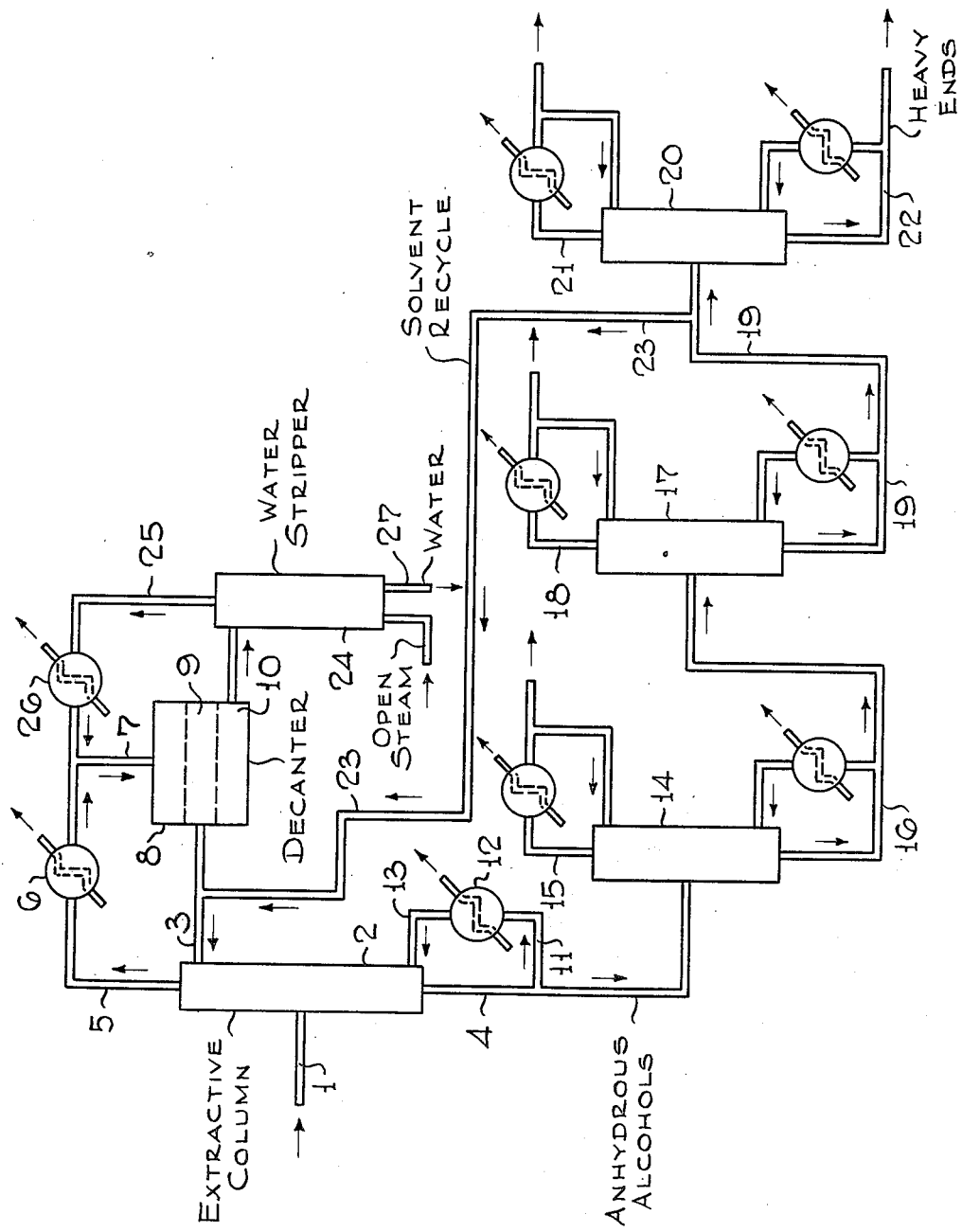
William E. Catterall Inventor
By Henry Berk Attorney Patented Apr. 8, 1952

2,591,671

UNITED STATES PATENT OFFICE 2,591,671

DEHYDRATION OF ALCOHOLS BY EXTRACTIVE DISTILLATION

William E. Catterall, Elizabeth, N. J., assignor to Standard Oil Development Company, a corporation of Delaware Application September 17, 1948, Serial No. 49,818

9 Claims. (Cl. 202—39.5)

This invention relates to the dehydration of an alcohol or mixture of alcohols by means of extractive distillation, and particularly by means of extractive distillation employing a water-immiscible alcohol as the extractive distillation solvent. More specifically, the invention is concerned with the dehydration of an alcohol mixture containing at least one water miscible alcohol and one or more water immiscible alcohols by means of extractive distillation employing a water immiscible alcohol as the extractive distillation solvent.

It is an object of this invention to dehydrate a water-soluble alcohol, or a mixture of at least one water-soluble alcohol with higher alcohols which are incompletely miscible with water. It is another object of this invention to dehydrate an aqueous alcohol or aqueous alcohols by means of extractive distillation employing water immiscible alcohols such as normal butyl alcohol, amyl alcohol, or other higher water immiscible alcohols, particularly those of four to six carbon atoms as the extractive distillation solvent. It is a further object of this invention to carry out the dehydration of aqueous alcohols without the introduction into the system of extraneous impurities such as hydrocarbons, ethers, and other known entrainers.

In various processes for the separation of hydrocarbon synthesis alcohol products, the normal alcohols from normal propanol to normal pentanol, etc., are obtained as a mixture of aqueous azeotropes free of esters, hydrocarbons, carbonyls, and other impurities. To yield marketable products, the mixture must be separated into anhydrous individual alcohols. The fractionation of this aqueous mixture into individual alcohols is difficult because of the presence of water which reduces the relative volatility between the alcohols. Furthermore, the distillation may be complicated by phase separation in the towers due to the limited water solubility of the alcohols higher than normal propanol. Thus, important advantages accrue from dehydration of the alcohol mixture prior to separation.

According to the terms of this invention, the aqueous alcohol, or mixtures of aqueous alcohols, is subjected to a distillation operation in which the aqueous alcohol solution is fed to a distillation tower at a point below the top, preferably at about the mid-point of the tower, and in which a water-immiscible solvent alcohol, for example, normal amyl alcohol, normal hexyl alcohol, etc., is fed to the top of the tower, or at a point near the top thereof, in sufficient quantity to maintain a composition above 50 mol per cent solvent alcohol in the liquid phase in the distillation column. The operable solvent alcohol concentration will vary with the aqueous alcohol mixture being dehydrated and with the particular solvent alcohol used. For example, ethanol will require a concentration above 80 mol per cent amyl alcohol, preferably above 90 mol per cent; isopropanol will require a concentration of above 80 mol per cent amyl alcohol, preferably above 90 mol per cent; normal propanol will require a concentration of above 50 mol per cent amyl alcohol, preferably above 60 mol per cent, etc. The water immiscible alcohol thus supplied to the distillation tower during the distillation operation is sufficient to permit taking overhead all or substantially all of the water contained in the crude aqueous alcohol feed producing bottoms consisting of anhydrous alcohols plus the amyl alcohol employed as the extractive distillation solvent. These anhydrous alcohols are then readily separated by normal fractionation.

Data have been obtained which indicate that if only about 65 mol per cent normal amyl alcohol is maintained in the liquid on the bulk of the plates of the distillation tower in which an aqueous solution of normal propanol is being dehydrated, the relative volatility of water to propanol is approximately 2.5 which would make the separation relatively easy.

In general it will be desirable first to concentrate the alcohol or alcohol mixture to the maximum degree possible by straight fractionation in order to reduce the amount of water which must be eliminated by the subsequent extractive distillation process.

The invention will be more readily understood from the accompanying drawing which represents a flow plan in elevation of one process and accompanying apparatus for carrying out this invention.

Referring to the drawing, numeral 2 represents an extractive distillation tower such as a 45 plate column, to which an aqueous alcohol or mixture of aqueous alcohols is fed via line 1. For purposes of illustration, a feed containing 20 mol per cent normal propanol, 8 mol per cent $C_4$, $C_5$, and $C_6$ alcohols, and 72 mol per cent water is fed to the column. The feed line is located at a point preferably above the mid-section of the tower, for example, at about the 30th plate in a 45 plate tower. Normal amyl alcohol is fed to the tower in considerable amounts through line 3 at a point above the feed plate. In place of normal amyl alcohol, other water-immiscible alcohols such as normal hexyl alcohol, etc., or mixtures thereof, may be employed. Likewise, alcohol fractions rich in normal amyl alcohol, or mixtures of water-immiscible alcohols may be employed. However, for purposes of illustration, the process will be described using normal amyl alcohol as the extractive distillation solvent. The amyl alcohol is fed to the top or near the top of the tower, but always above the aqueous alcohol feed plate. To obtain the desired dehydration of the aqueous alcohol feed, the mixture is subjected to a continuous fractional distillation in column 2. The amyl alcohol introduced in sufficiently large quantity at the upper part of the tower effectively modifies the relative volatilities of the water and alcohols present in the feed and distillation of an extremely large part of the water from the alcohol feed is effected. The temperature of the aqueous alcohol fed to the extractive distillation zone is preferably close to the temperaure of the liquid on the plate at the point of addition of the feed, although it may be lower to partially condense vapors ascending to the feed plate. For continuous efficient operation the normal amyl alcohol must be added continuously near the top of the column while the aqueous alcohol being purified is continuously fed into the column at a lower point and while sufficient heat is provided to afford distillation throughout the column. The feed stream may be preheated to a temperature close to that of the internal liquid reflux under equilibrium boiling conditions at the point of introduction. The preheated aqueous alcohol feed stream may be liquid, partially vaporized, or completely vaporized when introduced into the extractive distillation column. Vapors of water and of the alcohols being dehydrated pass upwardly through the distillation zone in contact with descending internal liquid reflux under equilibrium reboiling and refluxing conditions.

The quantity of normal amyl alcohol required to be introduced continuously at the top part of the distillation zone for accomplishing the desired dehydration, is considerably greater than the quantity of condensate with which it becomes homogeneously mixed on each plate in order to make the normal amyl alcohol concentration of the internal reflux substantially above a critical minimum in the range above 50 mol per cent. With adequate normal amyl alcohol concentration in the internal reflux for effecting the dehydration, the alcohol to be isolated is dissolved in the normal amyl alcohol internal liquid reflux that reaches the bottom of the distillation column. For example, in the dehydration of normal propyl alcohol employing normal amyl alcohol as the extractive distillation solvent, the ratio of solvent to feed may be adjusted so that anhydrous alcohol bottoms containing 2 to 20 volume per cent normal propyl alcohol may be obtained.

Returning to the drawing, the water contained in the alcohol is removed overhead from the distillation column via line 5 together with some of the amyl alcohol. The overhead is condensed in condenser 6 and led via line 7 to decanter 8 where the amyl alcohol due to its limited solubility in water is easily recovered. The condensate separates into an upper normal amyl alcohol layer 9 which is returned to the extractive distillation tower.

Bottoms from the tower 2 consisting of anhydrous alcohols are removed via line 4 and introduced into concentrating column 14. Part of the alcohol bottoms are withdrawn from line 4 via line 11 and fed to a reboiler 12 where it is boiled by heat exchange with a heating medium such as steam and returned via line 13 to the bottom of the distillation column. In fractionator 14, normal propanol is recovered overhead via line 15, while the bottoms consisting of normal butanol, pentanol, and hexanol are led via line 16 to fractionator 17 from which the butanol is recovered as overhead via line 18. Bottoms are removed from fractionator 17 via line 19 and led to fractionator 20 in which the normal pentanol is separated overhead via line 21 from normal hexanol and any other heavier material which is recovered as bottoms through line 22. Part of the stream of normal pentanol and higher alcohols is recycled via line 23 for introduction into the extractive distillation column as solvent through line 23.

The water layer 10 separating in decanter 8 is treated in water stripper 24 for the recovery of any alcohol contained therein. The stripper is heated by any suitable means such as open steam, and the alcohols recovered overhead via line 25 condensed in condenser 26 and led to the decanter via line 7. Water is removed from the system via line 27.

In the distillation process, the mol per cent normal amyl alcohol in the total overhead from the extractive distillation column will vary with the operating conditions, however, under controlled operation, the concentration of amyl alcohol solvent in the vapors going overhead will be kept at a minimum in the range of 20 to 60 mol per cent. In certain instances it may be necessary to add plates to the tower above the amyl alcohol feed point to reduce the amyl alcohol content of the overhead vapors to the point where efficient phase separation of the overhead occurs on condensation and cooling.

Without attempting to explain the mechanism by which the desired separation occurs in the distillation column, it can be said that the process is one of vapor-liquid extraction in which the vapors contain a greater concentration of water relative to the alcohol being dehydrated than under the normal fractional conditions in the absence of the considerable amount of normal amyl alcohol internal reflux. It is evident from the results obtained that the normal amyl alcohol employed within the limits specified increases the effective vapor pressure of water in comparison with the vapor pressure of the alcohol being dehydrated, thus allowing the water to pass overhead from the distillation zone.

Although the invention has been illustrated by the dehydration of a mixture of normal propanol and higher alcohols by means of extractive distillation using normal amyl alcohol as the solvent, the invention is not to be limited thereto inasmuch as it is equally applicable to the dehydration of one or more water miscible alcohols or mixtures of alcohols containing at least one water miscible alcohol. Likewise the solvent employed as the extractive distillation solvent may be any water immiscible alcohol, or mixtures of water immiscible alcohols, or alcohol fractions rich in water immiscible alcohols. Normal amyl alcohol is the preferred solvent. Normal hexanol may also be employed, but its use is probably less economical than normal amyl alcohol due to the higher re-boiler temperature required, higher solvent sensible heat loads, and higher liquid viscosities. A normal butanol fraction could be used as an alternate to amyl alcohol as the extractive distillation solvent in the dehydration of a water miscible alcohol. The use of normal butanol would permit lower re-boiler temperature in the extractive distillation still and in the propanol refining still, but these factors would be offset by the increased mol faction of normal butanol required in the liquid on the plates to produce the same relative volatility of water to normal propanol, by the increased quantities of normal butanol taken overhead in the extractive distillation column, and by the more difficult fractionation conditions necessary in the normal propanol refining column.

Although there has not been found any critical minimum solvent concentration which must be used to effect the desired dehydration for dehydrating normal propanol, it has been found that the following are the minimum useful concentrations of solvent for the various possible solvents according to the terms of this invention.

| Solvent | Minimum Concentration Mol Per Cent |
|---|---|
| $C_4$ Alcohols (not completely water miscible) | 60 |
| $C_5$ Alcohols (not completely water miscible) | 50 |
| $C_6$ Alcohols (not completely water miscible) | 50 |

These concentrations in some cases are lower than those necessary to form a homogeneous mixture with pure water. However, in an actual extractive distillation column, this minimum concentration will exist at a point where the lower alcohol to be dehydrated will be present in appreciable concentration and will solubilize the water in the alcohol.

When employing normal amyl alcohol as the extractive distillation solvent in the dehydration of normal propanol, it has been found that the extractive distillation column operates efficiently with the following normal amyl alcohol concentrations in the liquid phase:

|   | Mol percent |
|---|---|
| 1. Above the feed plate | 85 |
| 2. Below the feed plate | 65 |
| 3. In the bottoms | 94 |

Ethanol and isopropanol are considerably more difficult to dehydrate than normal propanol because of the higher vapor pressures of these alcohols relative to water. In other words, it is necessary to produce a reversal of volatility to a higher degree than with normal propanol. These alcohols therefore require a higher solvent concentration to cause the water to distill overhead. In general, for the dehydration of ethanol or isopropanol, a minimum useful solvent concentration is 80 mol per cent using water immiscible butyl, amyl, or hexyl alcohols as the solvent.

It is not expected that the process would be generally operable for dehydrating methanol because of the high vapor pressure of methanol relative to water. However, there would be little point in applying the process to methanol since methanol can be separated from water by straight fractionation. The water immiscible $C_4$ and higher alcohols can also be readily dehydrated by straight fractionation because the water azeotropes of these alcohols are heterogeneous. Thus the process is particularly applicable to those alcohols forming homogeneous binary azeotropes with water, including ethanol, isopropanol, n-propanol, allyl alcohol, and tertiary butanol.

The process may be applied to dehydrate a principal alcohol containing quantities of a lighter alcohol. For example, aqueous n-propanol containing quantities of ethanol could be dehydrated. In this case the process could be operated in such a manner as to dehydrate both alcohols by allowing both alcohols to be removed from the fractionating zone in the solvent alcohol bottoms. However, it might be preferable to use less effective fractionating conditions and to allow all or a portion of the ethanol to pass overhead with the water. Part of the ethanol going overhead would be dissolved in the decanted water layer, and could be recovered from this water layer separately from the solvent alcohol also contained in this layer. The remaining part of the ethanol going overhead would be dissolved in the solvent alcohol layer and would be recycled to the tower with this layer. This recycle of ethanol would tend to build up the ethanol concentration in the overhead stream, but this build-up is not serious unless it interferes with efficient overhead phase separation, in which case adequate methods of separating the overhead stream components by further fractionation will be apparent to those skilled in the art. Similarly, ethanol containing quantities of methanol may be handled by this process. Also, volatile, non-alcoholic impurities can be eliminated in the overhead together with the rejected water. For example, acetone impurity in isopropanol might be removed to some degree in the dehydration process.

What is claimed is:

1. The method of dehydrating aqueous water miscible alcohol of 2 to 4 carbon atoms per molecule which comprises continuously feeding the aqueous water miscible alcohol to a fractional distillation zone at an intermediate point thereof, continuously adding sufficient water immiscible alcohol of 4 to 6 carbon atoms per molecule to the fractional distillation zone substantially above the aqueous alcohol feed point to maintain an internal liquid reflux having a water immiscible alcohol content in the range above 50 mol per cent below the point of addition of the water immiscible alcohol, distilling from said aqueous water miscible alcohol a vaporous mixture comprising water wherein the distilled vaporous mixture flows countercurrent to the water immiscible alcohol reflux, and withdrawing a dehydrated solution of the water miscible and the water immiscible alcohol from a lower portion of the fractional distillation zone.

2. A process for the dehydration of normal propanol which comprises continuously feeding an aqueous solution of normal propanol to a fractional distillation zone at an intermediate point thereof, continuously adding water immiscible alcohol of 4 to 6 carbon atoms per molecule to the fractional distillation zone at a point substantially above the aqueous normal propanol feed point in amounts sufficient to maintain an internal liquid reflux having a water immiscible alcohol content in the range above 50 mol per cent below the point of addition of the water immiscible alcohol, distilling from said aqueous normal propanol a vaporous mixture comprising water wherein the distilled vaporous mixture flows countercurrent to the water immiscible alcohol reflux, and continuously withdrawing a dehydrated alcohol solution of normal propanol and the water immiscible alcohol from a lower portion of said fractional distillation zone.

3. A process according to claim 2 in which the water immiscible alcohol is normal amyl alcohol and in which the water immiscible alcohol is fed to the fractional distillation zone in amounts sufficient to maintain above 60 mol per cent normal amyl alcohol content below the point of addition of the normal amyl alcohol.

4. A process for dehydrating an aqueous mixture of normal propanol and at least one water immiscible alcohol which comprises continuously feeding the aqueous mixture to a fractional distillation zone at an intermediate point thereof, continuously adding sufficient water immiscible alcohol of 4 to 6 carbon atoms per molecule to the fractional distillation zone at a point substantially above the aqueous mixture feed point to maintain internal liquid reflux having a water immiscible alcohol content above 50 mol per cent below the point of addition of the water immiscible alcohol, distilling from said aqueous mixture a vaporous mixture comprising water wherein the distilled vaporous mixture flows countercurrent to the water immiscible alcohol reflux and continuously withdrawing an anhydrous solution of the dehydrated alcohols and the water immiscible alcohols from a lower portion of said fractional distillation zone.

5. A process according to claim 4 in which the water immiscible alcohol is normal amyl alcohol which is added to the fractional distillation zone in amounts sufficient to maintain an internal liquid reflux containing above 60 mol per cent normal amyl alcohol below the point of addition of the normal amyl alcohol.

6. A process for the dehydration of ethanol which comprises continuously feeding an aqueous solution of ethanol to a fractional distillation zone at an intermediate point thereof, continuously adding water immiscible alcohol of 4 to 6 carbon atoms per molecule to the fractional distillation zone at a point substantially above the aqueous ethanol feed point in amounts sufficient to maintain an internal liquid reflux having a water immiscible alcohol content in the range of at least 80 mol per cent below the point of addition of the water immiscible alcohol, distilling from said aqueous ethanol a vaporous mixture comprising water wherein the distilled vaporous mixture flows countercurrent to the water immiscible alcohol reflux, and continuously withdrawing a dehydrated alcohol solution of ethanol and the water immiscible alcohol from a lower portion of said fractional distillation zone.

7. A process according to claim 6 in which the water immiscible alcohol is normal amyl alcohol.

8. A process for the dehydration of isopropanol which comprises continuously feeding an aqueous solution of isopropanol to a fractional distillation zone at an intermediate point thereof, continuously adding water immiscible alcohol to the fractional distillation zone at a point substantially above the aqueous isopropanol feed point in amounts sufficient to maintain an internal liquid reflux having a water immiscible alcohol content in the range of at least 80 mol per cent below the point of addition of the water immiscible alcohol of 4 to 6 carbon atoms per molecule, distilling from said aqueous isopropanol a vaporous mixture comprising water wherein the distilled vaporous mixture flows countercurrent to the water immiscible alcohol reflux, and continuously withdrawing a dehydrated alcohol solution of isopropanol and the water immiscible alcohol from a lower portion of said fractional distillation zone.

9. A process according to claim 8 in which the water immiscible alcohol is normal amyl alcohol.

WILLIAM E. CATTERALL.

REFERENCES CITED

The following references are of record in the file of this patent:

UNITED STATES PATENTS

| Number | Name | Date |
|---|---|---|
| 2,096,871 | Atkins | Oct. 26, 1937 |
| 2,290,442 | Metzl | July 1, 1942 |
| 2,290,636 | Deanesly | July 21, 1942 |
| 2,339,160 | Dunn et al. | Jan. 11, 1944 |